United States Patent
Mimura et al.

(10) Patent No.: US 10,851,694 B2
(45) Date of Patent: Dec. 1, 2020

(54) REGENERATION CONTROL DEVICE FOR EXHAUST PURIFICATION DEVICE

(71) Applicant: Mazda Motor Corporation, Hiroshima (JP)

(72) Inventors: Yuki Mimura, Hiroshima (JP); Kenko Ujihara, Higashihiroshima (JP); Shinichi Morinaga, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/349,025

(22) PCT Filed: Nov. 6, 2017

(86) PCT No.: PCT/JP2017/039875
§ 371 (c)(1),
(2) Date: May 10, 2019

(87) PCT Pub. No.: WO2018/088341
PCT Pub. Date: May 17, 2018

(65) Prior Publication Data
US 2019/0264591 A1    Aug. 29, 2019

(30) Foreign Application Priority Data

Nov. 14, 2016 (JP) ................................. 2016-221701

(51) Int. Cl.
*F01N 3/02* (2006.01)
*F01N 3/033* (2006.01)
(Continued)

(52) U.S. Cl.
CPC ........... *F01N 3/0253* (2013.01); *F01N 3/021* (2013.01); *F01N 3/033* (2013.01); *F01N 9/002* (2013.01);
(Continued)

(58) Field of Classification Search
CPC ........ F01N 3/0253; F01N 3/021; F01N 3/033; F01N 9/002; F01N 2430/085;
(Continued)

(56) References Cited

U.S. PATENT DOCUMENTS 6,851,258 B2 * 2/2005 Kawashima ........ F02D 41/0245
60/311
7,322,185 B2 * 1/2008 Koga ...................... F01N 9/002
60/311
(Continued)

FOREIGN PATENT DOCUMENTS

DE    102008000159 A1    8/2008
EP         1387071 A1    2/2004
(Continued)

OTHER PUBLICATIONS

European Patent Office, Extended European Search Report Issued in Application No. 17869900.5, dated Sep. 11, 2019, Germany, 7 pages.

*Primary Examiner* — Thai Ba Trieu
(74) *Attorney, Agent, or Firm* — Alleman Hall Creasman & Tuttle LLP

(57) ABSTRACT

A regeneration control device for an exhaust purification device includes a regeneration controller that executes regeneration control in which particulate matters trapped by a filter are removed by combustion, and a post-injection controller that during the regeneration control, executes control in which a time period of a post-injection of fuel executed subsequently to a main injection of fuel is advanced such that a supercharging pressure of a turbosupercharger becomes higher than a supercharging pressure during steady operation.

8 Claims, 7 Drawing Sheets

(51) Int. Cl.

| | | |
|---|---|---|
| *F01N 9/00* | (2006.01) | |
| *F02B 37/00* | (2006.01) | |
| *F02D 23/00* | (2006.01) | |
| *F02D 41/00* | (2006.01) | |
| *F02D 41/02* | (2006.01) | |
| *F02D 41/04* | (2006.01) | |
| *F02D 41/08* | (2006.01) | |
| *F02D 41/12* | (2006.01) | |
| *F02D 41/14* | (2006.01) | |
| *F02D 41/38* | (2006.01) | |
| *F02D 41/40* | (2006.01) | |
| *F02D 43/00* | (2006.01) | |
| *F01N 3/025* | (2006.01) | |
| *F01N 3/021* | (2006.01) | |

(52) U.S. Cl.
CPC ............. *F02B 37/00* (2013.01); *F02D 23/00* (2013.01); *F02D 41/0007* (2013.01); *F02D 41/029* (2013.01); *F02D 41/0245* (2013.01); *F02D 41/04* (2013.01); *F02D 41/08* (2013.01); *F02D 41/12* (2013.01); *F02D 41/1445* (2013.01); *F02D 41/38* (2013.01); *F02D 41/405* (2013.01); *F02D 43/00* (2013.01); *F01N 2430/085* (2013.01); *F01N 2900/08* (2013.01); *F01N 2900/1411* (2013.01); *F01N 2900/1602* (2013.01); *Y02T 10/12* (2013.01); *Y02T 10/40* (2013.01)

(58) Field of Classification Search
CPC .......... F01N 2900/08; F01N 2900/141; F01N 2900/1602; F02B 37/00; F02D 23/00; F02D 41/0007; F02D 41/0245; F02D 41/029; F02D 41/04; F02D 41/08; F02D 41/12; F02D 41/1445; F02D 41/38; F02D 41/405; F02D 43/00; Y02T 10/144; Y02T 10/47
USPC .......... 60/311, 280, 285, 295, 299; 123/299, 123/300, 399, 406.47, 672; 701/103–105
See application file for complete search history.

(56) References Cited

U.S. PATENT DOCUMENTS

| | | | | |
|---|---|---|---|---|
| 7,503,169 | B2 * | 3/2009 | Saito | F01N 9/002 60/295 |
| 7,610,753 | B2 * | 11/2009 | Kitahara | F02D 41/405 60/311 |
| 7,870,845 | B2 * | 1/2011 | Sasaki | F02D 41/403 123/299 |
| 8,175,789 | B2 * | 5/2012 | Kojima | F02D 41/403 123/299 |
| 8,181,626 | B2 * | 5/2012 | Nada | F02D 41/402 123/299 |
| 8,826,650 | B2 * | 9/2014 | Yamada | F02D 41/0245 60/295 |
| 8,943,810 | B2 * | 2/2015 | Masubuchi | F01N 3/0253 60/295 |
| 8,978,365 | B2 * | 3/2015 | Ikeda | F02D 41/0245 60/311 |
| 2004/0134187 | A1 * | 7/2004 | Inoue | F02D 41/029 60/295 |
| 2011/0005223 | A1 | 1/2011 | Kawabe et al. | |
| 2012/0000197 | A1 * | 1/2012 | Maruyama | F02D 41/405 60/605.2 |
| 2013/0167508 | A1 | 7/2013 | Nishimura | |
| 2017/0268450 | A1 * | 9/2017 | Nagaoka | F02D 41/405 |
| 2017/0350299 | A1 * | 12/2017 | Nakada | F01N 9/00 |
| 2018/0202377 | A1 * | 7/2018 | Nakamura | F02D 41/405 |

FOREIGN PATENT DOCUMENTS

| | | | |
|---|---|---|---|
| EP | 2264301 | A1 | 12/2010 |
| JP | 2003206722 | A | 7/2003 |
| JP | 2004150416 | A | 5/2004 |
| JP | 2004263578 | A | 9/2004 |
| JP | 2008184900 | A | 8/2008 |
| JP | 2009293383 | A * | 12/2009 |
| JP | 2012036760 | A | 2/2012 |
| WO | WO-2016027736 | A1 * | 2/2016 ........... F02D 41/405 |

* cited by examiner

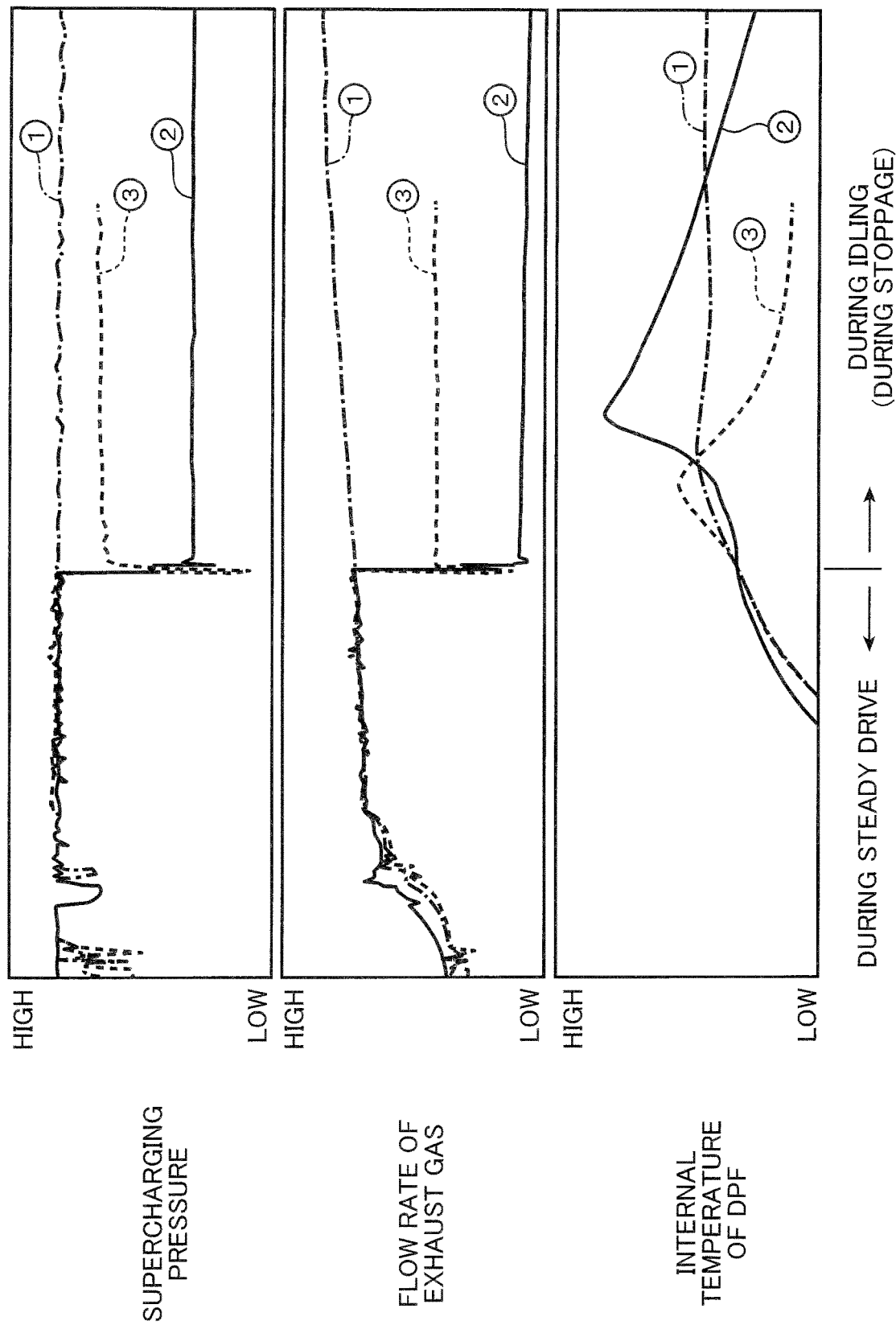

REGENERATION CONTROL DEVICE FOR EXHAUST PURIFICATION DEVICE

TECHNICAL FIELD

The present invention relates to a regeneration control device for an exhaust purification device in a vehicle or the like which is provided with an engine having a turbosupercharger equipped with the exhaust purification device.

BACKGROUND ART

In a vehicle or the like equipped with a diesel engine, a regenerable diesel particulate filter (DPF) is provided in an exhaust passage, and soot (particulate matters) contained in an exhaust gas is trapped by a filter in the DPF. Then, regeneration processing (forced regeneration) is executed for burning trapped soot at every fixed period (when more than a fixed amount of soot is trapped in the DPF). This enables continuous trap of soot by the DPF.

However, when much of soot trapped by the DPF is burnt at once, a sharp increase of a temperature of the DPF might cause damage to the DPF. Such situation is more likely to be caused by, for example, abrupt deceleration of a vehicle (engine) immediately after regeneration processing is started. In other words, deceleration causes a flow rate of an exhaust gas passing through the DPF to be reduced to damage a cooling effect of the DPF, resulting in inviting an abrupt temperature rise.

In order to solve such problem, for example, Patent Literature 1 discloses a technique related to an engine with a turbosupercharger, in which when the engine reaches a predetermined deceleration speed during regeneration processing of a DPF, an intake air amount is intentionally increased by supercharging control means to suppress the reduction in a flow rate of an exhaust gas.

In recent years, it is demanded to reduce the number of executions of regeneration processing by increasing an amount of soot trapped by a DPF, thereby efficiently operating the DPF. It is also demanded to execute regeneration processing of a DPF under such an operation condition as in idling, such as during stoppage of a vehicle, under which a supercharging pressure by a turbosupercharger is barely generated and a flow rate of an exhaust gas is extremely low. Therefore, there is an increasing demand for a technique for suppressing a temperature rise of a DPF as disclosed in Patent Literature 1.

However, the technique of Patent Literature 1 intends to increase an intake air amount during deceleration of the vehicle (engine). Further, regarding an increase of the intake air amount by the supercharging control means, Patent Literature 1 only recites that a supercharging pressure control constant is corrected, which can be hardly considered to be an embodiment. Therefore, it cannot be considered that an abrupt temperature rise of the DPF can be suppressed when regeneration processing of a DPF is executed under an operation condition where a supercharging pressure by a turbosupercharger is barely generated and a flow rate of an exhaust gas is extremely low as in idling.

CITATION LIST

Patent Literature

JP 2004-263578 A

SUMMARY OF INVENTION

The present invention has been made in light of the above-described circumstances, and an object of the present invention is to provide a technique enabling an excessive temperature rise of a filter to be effectively suppressed even in a case where during idling, filter regeneration of an exhaust purification device is conducted.

Then, the present invention relates to a regeneration control device for an exhaust purification device in an engine with a turbosupercharger having the exhaust purification device equipped with a filter that traps particulate matters in exhaust air, the regeneration control device including a regeneration controller that executes regeneration control in which particulate matters trapped by the filter are removed by combustion; and a post-injection controller that during the regeneration control, executes control in which a time period of a post-injection of fuel executed subsequently to a main injection of fuel is advanced such that a supercharging pressure of the turbosupercharger becomes higher than a supercharging pressure during steady operation.

BRIEF DESCRIPTION OF DRAWINGS

FIG. 8 is a graph showing a temporal change of a supercharging pressure, an exhaust flow rate, and a DPF inside temperature of the above turbosupercharger.

DESCRIPTION OF EMBODIMENTS

In the following, a preferred embodiment of the present invention will be detailed with reference to the accompanying drawings.

[1] Overall Configuration of Engine

Figure 1:
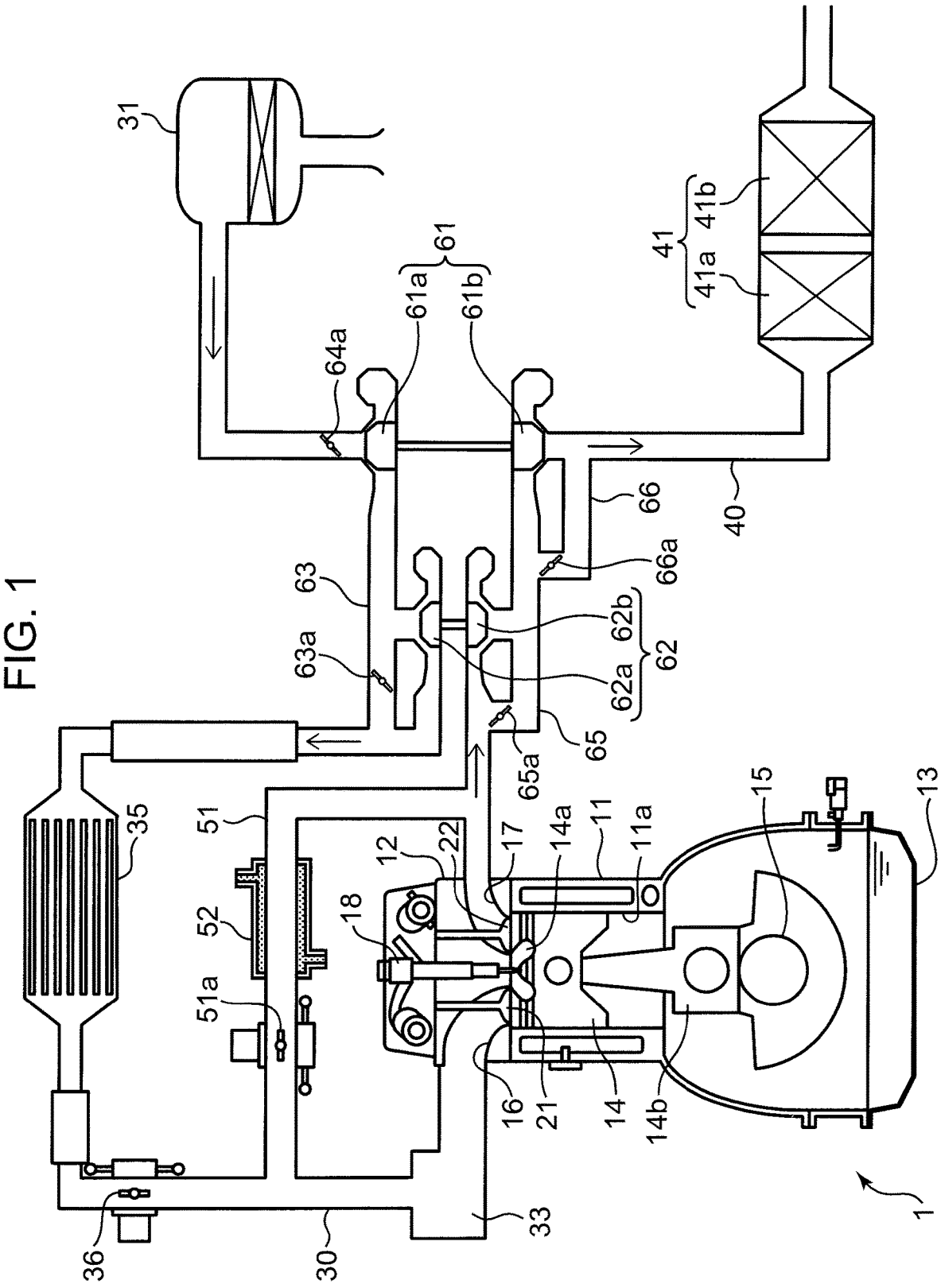
FIG. 1 is a view showing an overall configuration of a diesel engine with a turbosupercharger to which a regeneration control device for an exhaust purification device according to an embodiment of the present invention is applied.

FIG. 1 is a view showing an overall configuration of a diesel engine with a turbosupercharger to which a regeneration control device for an exhaust purification device according to one embodiment of the present invention is applied.

The diesel engine shown in FIG. 1 is a 4-cycle diesel engine mounted on a vehicle as a driving power source. An engine main body 1 of the diesel engine (hereinafter, referred to as the engine) is of an in-line multi-cylinder type and has a cylinder block 11 having a plurality of cylinders 11a (in FIG. 1, only one is illustrated), a cylinder head 12 disposed on the cylinder block 11, and an oil pan 13 disposed on a lower side of the cylinder block 11 to store a lubricating oil.

A piston 14 is inserted to be capable of reciprocating in each cylinder 11a of the engine main body 1. A cavity which sections a combustion chamber 14a is formed on a top surface of the piston 14.

The piston 14 is coupled to a crank shaft 15 via a connecting rod 14b, and the crank shaft 15 rotates around a center axis according to reciprocation of the piston 14.

The cylinder head 12 is provided with an intake port 16 and an exhaust port 17 which are opened in the combustion chamber 14a of each cylinder 11a, and is provided with an intake valve 21 and an exhaust valve 22 for opening/closing the intake port 16 and the exhaust port 17.

The cylinder head 12 is provided with an injector 18 for each cylinder 11a to jet fuel containing light oil as a main component. The injector 18 is arranged such that a nozzle hole (a fuel injection hole) provided at a front end of the injector 18 faces the cavity in the top surface of the piston 14. The injector 18 injects fuel toward the combustion chamber 14a at predetermined timing around a compression top dead center (at the end of a compression stroke).

An intake passage 30 is connected to one side of the engine main body 1 so as to communicate with the intake port 16 of each cylinder 11a, and an exhaust passage 40 is connected to the other side of the engine main body 1 so as to communicate with the exhaust port 17 of each cylinder 11a. Specifically, external intake air is introduced into the combustion chamber 14a through the intake passage 30 and the intake port 16, while an exhaust gas (combustion gas) generated in the combustion chamber 14a is discharged to the outside through the exhaust port 17 and the exhaust passage 40.

The intake passage 30 and the exhaust passage 40 are each provided with a first turbosupercharger 61 and a second turbosupercharger 62 smaller than the first turbosupercharger 61.

The first turbosupercharger 61 has a compressor 61a disposed in the intake passage 30 and a turbine 61b coupled coaxially with the compressor 61a and disposed in the exhaust passage 40. Similarly, the second turbosupercharger 62 has a compressor 62a disposed in the intake passage 30 and a turbine 62b coupled coaxially with the compressor 62a and disposed in the exhaust passage 40. The compressor 61a and turbine 61b of the first turbosupercharger 61 are formed to have sizes larger than the compressor 62a and turbine 62b of the second turbosupercharger 62.

The first and second turbosuperchargers 61 and 62 are driven by exhaust energy to compress intake air. Specifically, when a high temperature and high speed exhaust gas passes through the exhaust passage 40 during operation of the engine, the turbines 61b and 62b of the respective turbosuperchargers 61 and 62 rotate upon receiving energy of the exhaust gas, and the compressors 61a and 62a coupled thereto also rotate simultaneously. In this manner, the air (intake air) passing through the intake passage 30 is compressed and pressurized, and force-fed to each cylinder 11a of the engine main body 1.

The compressor 61a of the first turbosupercharger 61 is disposed on a more upstream side of the intake passage 30 than the compressor 62a of the second turbosupercharger 62. The turbine 61b of the first turbosupercharger 61 is disposed on a more downstream side of the exhaust passage 40 than the turbine 62b of the second turbosupercharger 62.

The intake passage 30 is provided with an intake bypass passage 63 for bypassing the compressor 62a of the second turbosupercharger 62. The first intake bypass passage 63 is provided with a first intake bypass valve 63a capable of opening and closing. A restrictor valve 64a is provided on a passage of the intake passage 30, between an air cleaner 31 to be described later and the compressor 61a of the first turbosupercharger 61.

The exhaust passage 40 is provided with a first exhaust bypass passage 65 for bypassing the turbine 62b of the second turbosupercharger 62, and a second exhaust bypass passage 66 for bypassing the turbine 61b of the first turbosupercharger 61. The first exhaust bypass passage 65 is provided with a regulating valve 65a capable of opening and closing, and the second exhaust bypass passage 66 is provided with a wastegate valve 66a capable of opening and closing.

An air cleaner 31 for filtering intake air is provided in an upstream end portion of the intake passage 30. A surge tank 33 is provided near a downstream end of the intake passage 30 (near the engine main body 1). A more downstream side of the intake passage 30 than the surge tank 33 is formed as an independent passage branched for each cylinder 11a, and each independent passage has a downstream end connected to the intake port 16 of each cylinder 11a.

Between the air cleaner 31 and the surge tank 33 in the intake passage 30, there are provided, sequentially from the upstream side, the compressor 61a of the first turbosupercharger 61, the compressor 62a of the second turbosupercharger 62, an intercooler 35 for cooling air compressed by the compressors 61a and 62a, and a throttle valve 36 capable of opening and closing for adjusting a passage sectional area of the intake passage 30. The throttle valve 36 is basically maintained to be fully opened or have a high opening degree close to full open during operation of the engine, and is closed to disconnect the intake passage 30 only when necessary such as during engine stop or the like.

In the exhaust passage 40, an upstream side part adjacent to the engine main body 1 is formed as an exhaust manifold including an independent passage branched to communicate with the exhaust port 17 of each cylinder 11a and an assembly part in which independent passages assemble.

On a more downstream side of the exhaust passage 40 than the exhaust manifold, there are provided, sequentially from the upstream side, the turbine 62b of the second turbosupercharger 62, the turbine 61b of the first turbosupercharger 61, an exhaust purification device 41 for purifying noxious components in an exhaust gas, and a silencer not shown for reducing exhaust sound.

The exhaust purification device 41 includes a DOC (Diesel Oxidation Catalyst) 41a and a DPF (Diesel Particulate Filter) 41b, sequentially from the upstream side.

The DOC 41a (corresponding to an oxidation catalyst of the present invention) serves to detoxify an exhaust gas discharged from the engine main body 1 by oxidizing CO and HC. Specifically, CO (carbon monoxide) and HC (hydrocarbon) in an exhaust gas are oxidized when passing through the DOC 41a to be purified into $CO_2$ (carbon dioxide) or $H_2O$ (water). The DOC 41a also serves to increase a temperature of the exhaust gas by oxidation reaction of such an exhaust gas occurring therein, thereby flowing a high temperature exhaust gas into a downstream side DPF 32.

The DPF 41b (a filter corresponding to the present invention) traps particulate matters (hereinafter, referred to as soot) such as soot contained in an exhaust gas discharged from the engine main body 1. The DPF 41b is a wall-through type filter made of ceramics, for example, SiC (silicon carbide). Soot in the exhaust gas is trapped by a cell wall of the DPF 41b when passing from a flow-in side toward a flow-out side of the cell wall. When soot is continuously trapped, the DPF 41b is clogged to reduce function of the DPF 41b. Therefore, in this engine, so-called forced regeneration is executed at predetermined timing, in which the DPF 41b is regenerated by forcibly increasing a temperature of the DPF 41b to burn accumulated soot. Among various methods are known as a method of forced regeneration of the DPF 41b, a post-injection of injecting fuel in an expansion stroke is executed in this engine after a main injection of injecting fuel near a top dead center (TDC) in the compression stroke. In other words, an unburned fuel (HC) is fed by the post-injection into the DPF 41b where the unburned fuel is oxidized (burned) to increase a temperature of an exhaust gas, thereby increasing the temperature of the DPF 41b to remove accumulated soot by combustion. Such regeneration control (regeneration control of the exhaust purification device) of the DPF 41b will be detailed later.

An EGR passage 51 for refluxing a part of an exhaust gas to the intake passage 30 is provided between the intake passage 30 and the exhaust passage 40. In other words, the intake passage 30 between the surge tank 33 and the throttle valve 36 and the exhaust passage 40 between the exhaust manifold and the turbine 62b of the second turbosupercharger 62 are connected to each other via the EGR passage 51. In the EGR passage 51, there are provided an EGR valve 51a capable of opening and closing for adjusting a reflux amount of an exhaust gas to the intake passage 30 and an EGR cooler 52 for cooling an exhaust gas by cooling water of the engine.

[2] Control System

Thus configured engine is controlled by a power train control module (hereinafter, referred to as PCM) 10 mounted on a vehicle. The PCM 10 is a microprocessor having a CPU, a memory, counter timers, an I/F, and the like.

Figure 2:
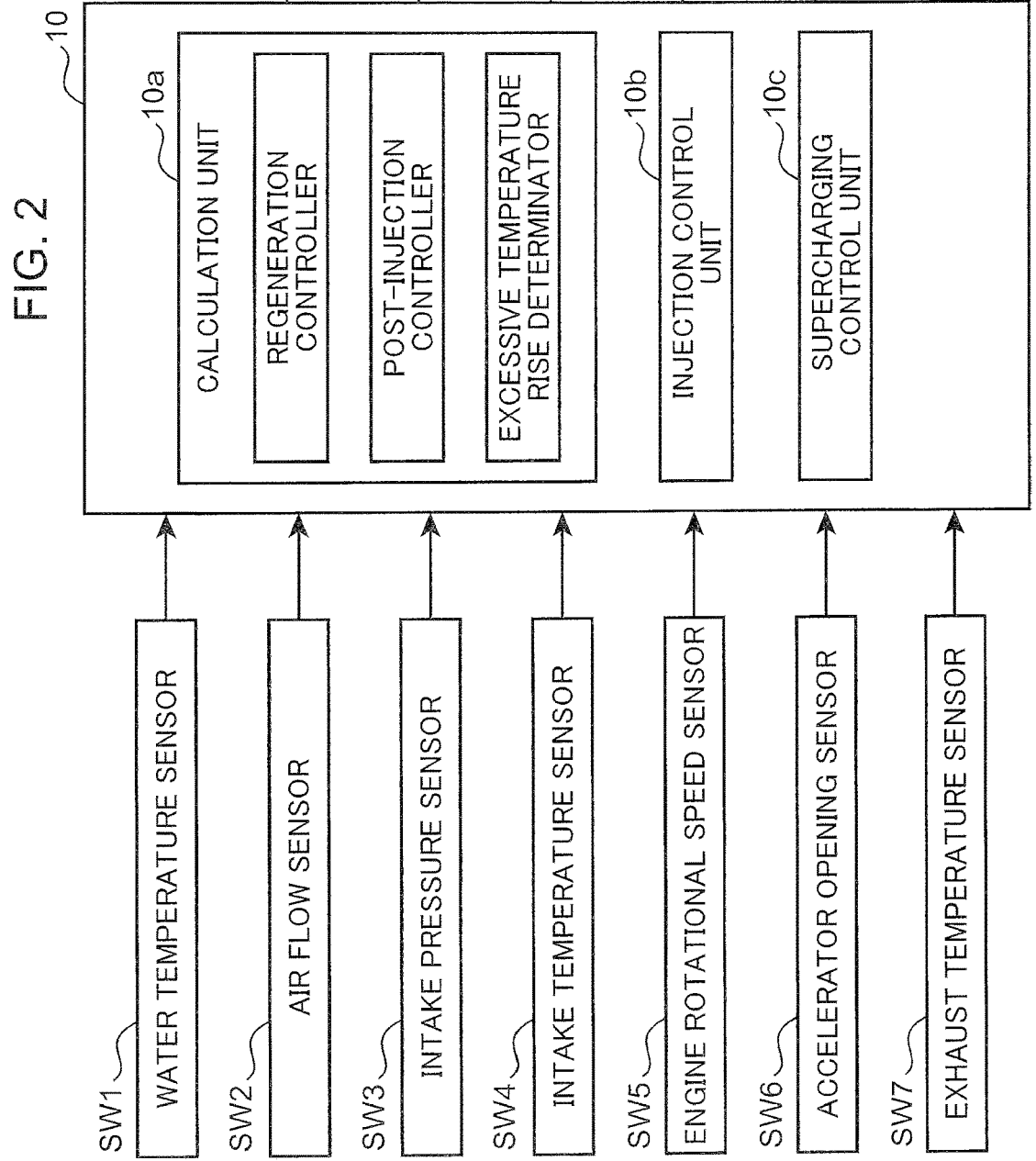
FIG. 2 is a block diagram showing a control system of the above engine.

The PCM 10 receives input of various information from each kind of sensors shown in FIG. 2. Specifically, the engine or the vehicle is provided with a water temperature sensor SW1 which detects a temperature of a cooling water of the engine main body 1 (engine water temperature), an air flow sensor SW2 (corresponding to an exhaust flow rate detector of the present invention) which detects a flow rate of intake air (intake air amount) passing through the intake passage 30, an intake pressure sensor SW3 (corresponding to a supercharging pressure detector of the present invention) which detects a pressure of intake air (intake pressure) in the surge tank 33, an intake temperature sensor SW4 which detects a temperature of intake air (intake temperature), an engine rotational speed sensor SW5 which detects a rotational speed (engine rotational speed) of the crank shaft 15 of the engine main body 1, an accelerator opening sensor SW6 which detects an accelerator opening corresponding to an operation amount of an accelerator pedal (not shown) of the vehicle, and an exhaust temperature sensor SW7 (corresponding to an exhaust temperature detector of the present invention) which detects a temperature of an exhaust gas (exhaust temperature) in the exhaust purification device 41, to be specific, a temperature of an exhaust gas before being introduced into the DPF 41b after passing through the DOC 41a. These respective sensors SW1 to SW7 are electrically connected to the PCM 10. The PCM 10 obtains various information such as an engine water temperature, an intake flow rate, an intake pressure, an intake temperature, an engine rotational speed, an accelerator opening, and an exhaust temperature on the basis of input signals from the above respective sensors SW1 to SW7.

The PCM 10 also controls each unit of the engine while executing various calculations on the basis of the input signals from the above respective sensors SW1 to SW7. Specifically, the PCM 10 is electrically connected to the injector 18 and the above-described valves 36, 51a, 63a, 64a, 65a, and 66a to output driving control signals to these apparatuses on the basis of results of the above calculation.

More specific functional configuration of the PCM 10 will be described. As shown in FIG. 2, the PCM 10 has a calculation unit 10a, an injection control unit 10b, and a supercharging control unit 10c.

The calculation unit 10a executes various calculations on the basis of detection signals of the above respective sensors SW1 to SW7, as well as determining states of the engine and the vehicle. As described later, the calculation unit 10a has a function of executing regeneration control for removing soot trapped by the DPF 41b by combustion, a function of determining possibility/impossibility of an excessive temperature rise of the DPF 41b when the regeneration control is executed, and a function of correcting a time period of a fuel injection in the regeneration control, in details, a time period of the post-injection. Specifically, in this example, the calculation unit 10a corresponds to a regeneration controller, an excessive temperature rise determinator, and a post-injection controller of the present invention. Additionally, the calculation unit 10a, the air flow sensor SW2, intake pressure sensor SW3, exhaust temperature sensor SW7, and the like correspond to the regeneration control device of the present invention.

The injection control unit 10b drive-controls the injector 18 such that fuel is injected to each cylinder 11a according to an injection amount, an injection pattern, and injection timing determined by calculation by the calculation unit 10a, or the like.

The supercharging control unit 10c controls operation of the first turbosupercharger 61 and the second turbosupercharger 62 by controlling opening of the intake bypass valve 63a, the regulating valve 65a, and the wastegate valve 66a.

Figure 3:
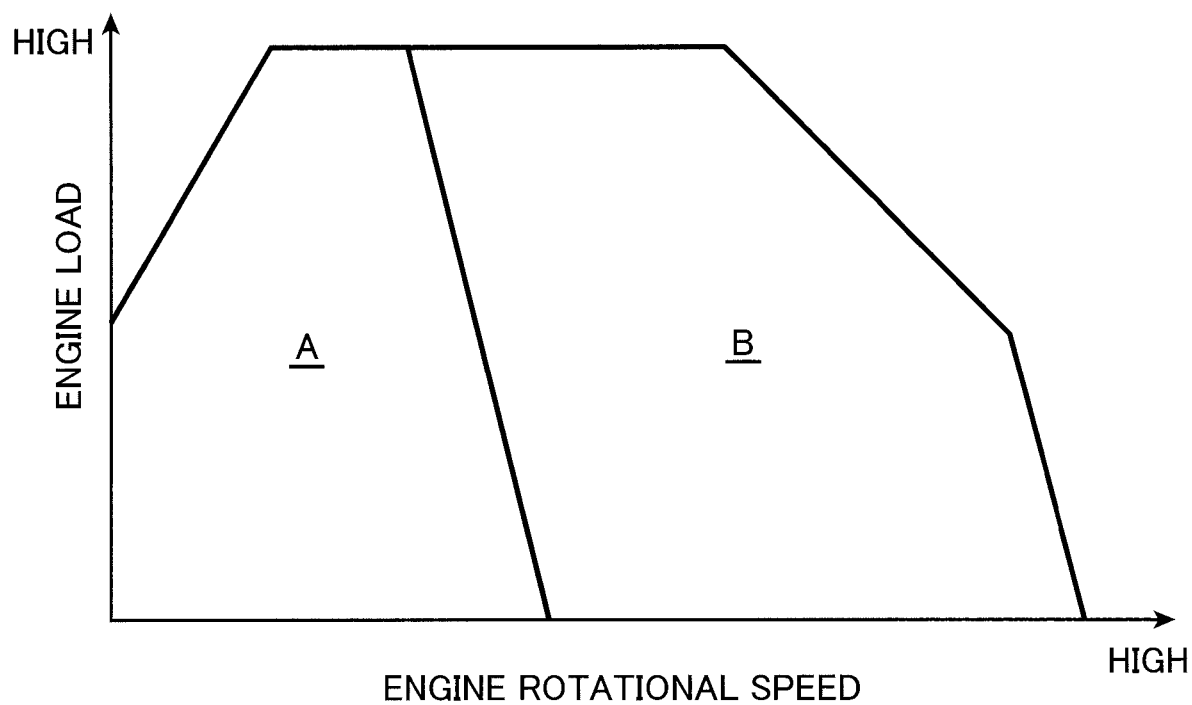
FIG. 3 is a diagram showing one example of a control map for use in control of the above turbosupercharger.

Operation switching of the above respective turbosuperchargers 61 and 62 during steady operation is executed on the basis of a control map, for example, shown in FIG. 3. In FIG. 3, a first region A located on a low speed side where the engine rotational speed is relatively low is set to be a region where both the first turbosupercharger 61 and the second turbosupercharger 62 operate. By contrast, a second region B located on a higher speed side than the above first region A is set to be a region where only the first turbosupercharger 61 operates. Then, it is determined by the calculation unit 10a in which operation region of the first region A and the second region B, the engine is in operation, and the supercharging control unit 10c controls each of the above valves 63a, 65a, and 66a on the basis of the determination result.

Specifically, in the first region A on the low speed side, basically fully closing the intake bypass valve 63a, the regulating valve 65a, and the wastegate valve 66a causes both the first turbosupercharger 61 and the second turbosupercharger 62 to operate. By contrast, in the second region B on the high speed side, an exhaust gas amount is relatively large to make the small-sized turbine 62b of the second turbosupercharger 62 become an exhaust resistance. Therefore, full-open of the intake bypass valve 63a and the regulating valve 65a together with full-close of the wastegate valve 66a causes only the first turbosupercharger 61 to operate and the second turbosupercharger 62 not to operate.

[3] Regeneration Control of Exhaust Purification Device (DPF 41b)

Before description of specific regeneration control of the DPF 41b by the calculation unit 10a of the PCM 10, basic injection control of fuel as a premise will be described.

During operation of the engine, the injector 18 is controlled by the calculation unit 10a via the injection control unit 10b such that fuel is injected in an appropriate manner according to a state of the operation of the engine. In other words, the calculation unit 10a obtains information such as an engine cooling water temperature, an intake air amount, an intake pressure, an intake temperature, an engine rotational speed, an accelerator opening, and an exhaust temperature on the basis of output signals from the above respective sensors SW1 to SW7 to determine an injection amount and an injection pattern of fuel to be injected from the injector 18 on the basis of these information and also to determine injection timing of the fuel.

These injection amount, injection pattern, and injection timing are determined with reference to a fuel injection map in which appropriate fuel injection manners according to various parameters such as an accelerator opening degree and an engine rotational speed are determined in advance. In other words, by the reference to the fuel injection map, a fuel injection amount is determined on the basis of at least an accelerator opening degree (i.e. required torque of the engine) and a fuel injection pattern and injection timing are determined on the basis of at least the determined injection amount and an engine rotational speed.

Figure 4:
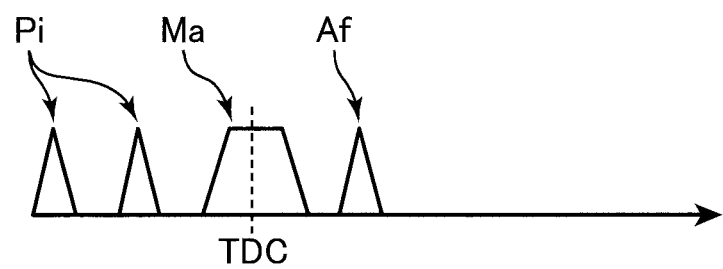
FIG. 4 is a timing chart showing one example of a fuel injection pattern.

Here, a fuel injection pattern represents how many times of injection is required for an injection amount to be injected from the injector 18 and what ratio of injection is required. For example, in this example, at least two fuel injections called a pilot injection Pi and a main injection Ma are executed in many operation regions. Also, depending on an operation region, an additional fuel injection called after-injection is executed after the main injection Ma. FIG. 4 conceptually shows an injection pattern, with a horizontal axis representing a crank angle (CA) and a vertical axis representing an injection amount. In the drawing, a total of four times of fuel injection are executed including two times of the pilot injection Pi, the main injection Ma, and one time of after-injection Af.

The main injection Ma is a fuel injection conducted before or near a compression top dead center (TDC) such that an injected fuel starts burning around the compression top dead center. The pilot injection Pi is a fuel injection of a small amount conducted before the main injection Ma in order to cause preliminary combustion (preliminary combustion) before combustion (main combustion) on the basis of the main injection Ma. The after-injection Af is a fuel injection conducted aiming at suppressing generation of soot.

Fuel injection timing is determined in consideration of required torque and fuel consumption, EM (emission performance), and the like. In other words, the fuel injection map stores optimum injection timing for each kind of condition in consideration of a torque, fuel consumption, and the like, from which map, injection timing suitable for a current operation condition is read and determined.

As described above, in this engine, so-called forced regeneration of the DPF 41b is executed, in which the DPF 41b is regenerated by forcibly increasing the temperature of the DPF 41b to burn accumulated soot at predetermined timing. Specifically, the injector 18 is controlled by the calculation unit 10a via the injection control unit 10b such that fuel is injected into the combustion chamber 14a in a latter period of the expansion stroke after the main injection Ma. Such fuel injection is called post-injection Po and is known as one method of forced regeneration of a DPF. More specifically, when fuel is again injected into the combustion chamber 14a in the latter period of the expansion stroke after the main injection Ma, much of the injected fuel will not be oxidized but be supplied as HC (unburned fuel) to the DOC 41a together with an exhaust gas and then oxidized by the DOC 41a. The oxidization reaction causes a temperature of the exhaust gas to increase, and the high temperature exhaust gas is introduced into the DPF 41b to increase the temperature of the DPF 41b, so that trapped soot is removed by combustion.

An injection amount, an injection pattern, and injection timing of the post-injection Po are determined with reference to the above fuel injection map. In other words, similarly to the above main injection Ma and the like, the injection amount, the injection pattern, and the injection timing of the post-injection Po are determined in the above fuel injection map. The calculation unit 10a determines the injection amount, the injection pattern, and the injection timing of the post-injection Po on the basis of an accelerator opening, an engine rotational speed, and the like with reference to the above fuel injection map.

Figure 5:
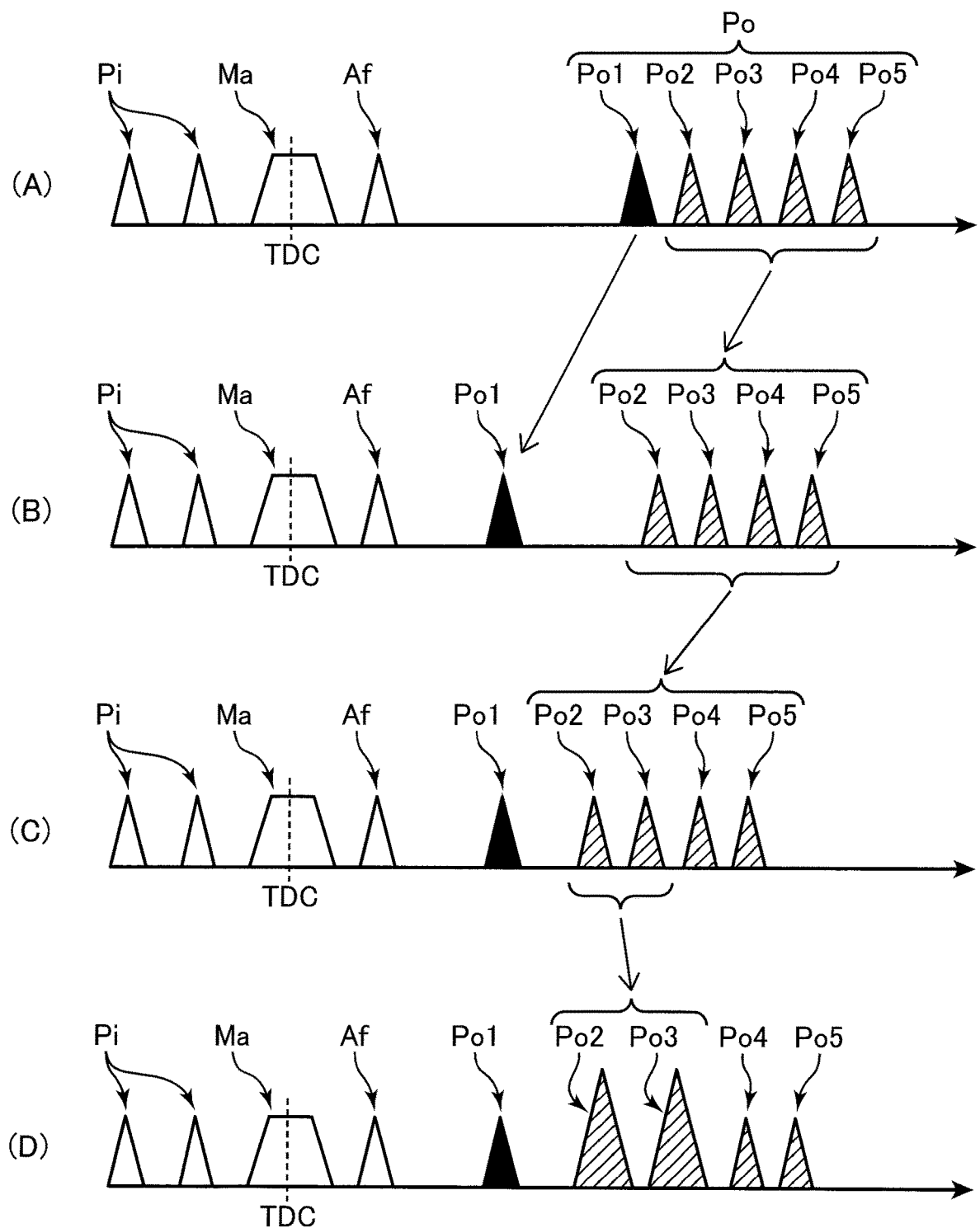
FIG. 5 is a timing chart showing a fuel injection pattern.

The chart (A) of FIG. 5 conceptually shows an injection pattern in a case of regeneration of the DPF 41b, with a horizontal axis representing the crank angle (CA) and a vertical axis representing an injection amount similarly to FIG. 4. In the example shown in the drawing, the post-injection Po is conducted five times at the same ratio.

The foregoing is basic injection control of fuel by the calculation unit 10a. Hereinafter, description will be made of specific regeneration control of the exhaust purification device (the DPF 41b) by the calculation unit 10a with reference to the flow chart in FIG. 6.

Figure 6:
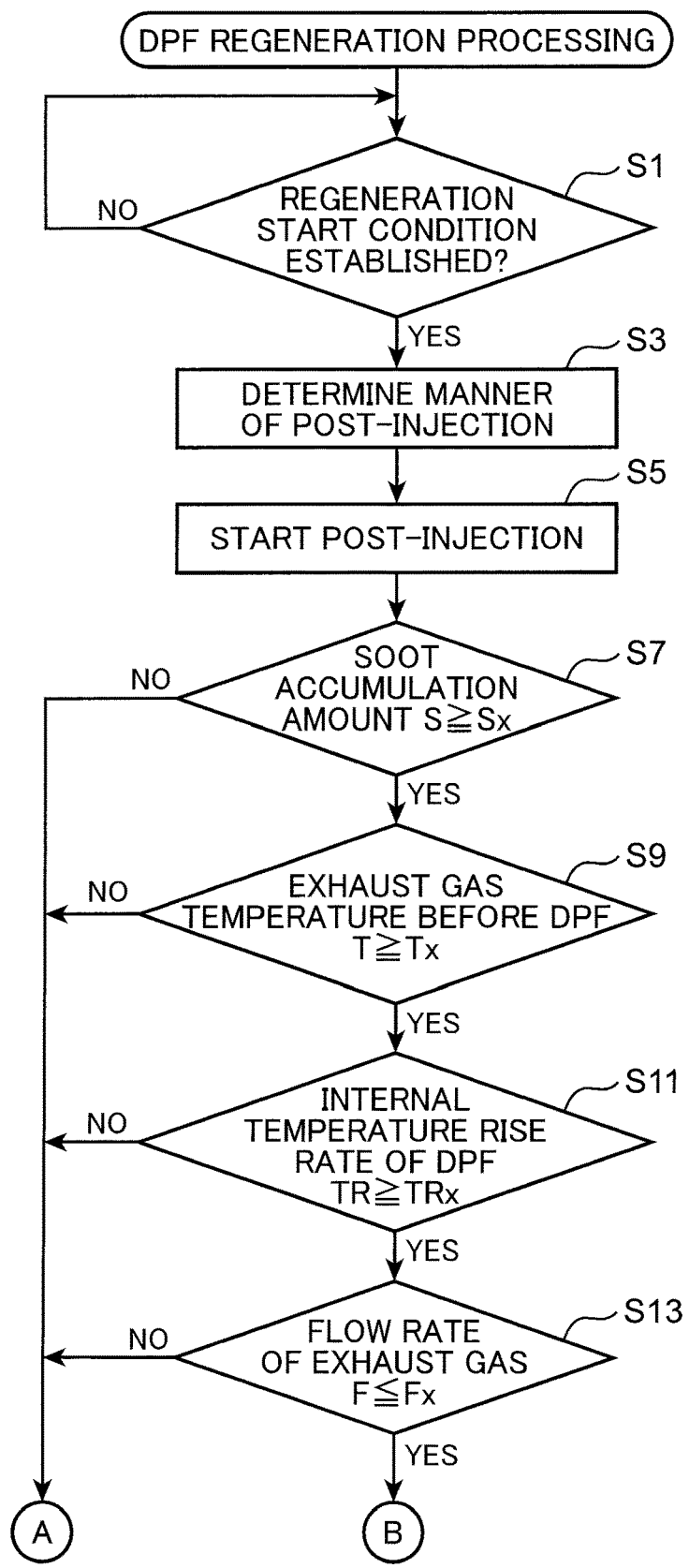
FIG. 6 is a flow chart showing control contents of DPF regeneration processing of the above engine.

When the processing shown in FIG. 6 starts, the calculation unit 10a of the PCM 10 determines whether a predetermined regeneration start condition is satisfied or not, e.g., whether or not a travelling distance of the vehicle exceeds a travelling distance set in advance (Step S1).

Here, when the determination is Yes, the PCM 10 starts the regeneration processing of the DPF 41b. Specifically, the calculation unit 10a determines an injection manner (an injection amount, an injection pattern, and injection timing) of the post-injection Po (Step S3), and drive-controls the injector 18 via the injection control unit 10b on the basis of the injection manner with reference to the above fuel injection map. In other words, the fuel injection is started which further includes the post-injection Po in addition to the pilot injection Pi, the main injection Ma, and the like (Step S5).

In this manner, after the main injection Ma, the post-injection Po is conducted in the latter period of the expansion stroke to start regeneration of the DPF 41b.

In the following description, an injection manner of the post-injection Po determined with reference to the above fuel injection map in Step S3 will be referred to as a basic injection manner (a basic injection amount, a basic injection pattern, and basic injection timing) in some cases.

When the regeneration of the DPF 41b is started, the calculation unit 10a determines whether the DPF 41b satisfies a predetermined excessive temperature rise condition or not. In other words, the calculation unit 10a determines a possibility of an excessive temperature rise of the DPF 41b.

Specifically, first, the calculation unit 10a determines whether or not a soot accumulation amount S in the DPF 41b at a start of the regeneration is a threshold value Sx set in advance or more as a first condition (Step S7). The soot accumulation amount S is an estimated load obtained on the basis of a history of a fuel injection amount and an EGR amount. In other words, during operation of the engine, the calculation unit 10a stores the fuel injection amount and the EGR amount as a history in a storage unit not shown, and calculates the soot accumulation amount S by a predetermined calculation formula on the basis of an accumulated value of fuel injection amounts and an accumulated value of the EGR amounts accumulated from, for example, a time point of execution of previous forced regeneration. The threshold value Sx of the accumulation amount S is set to be, for example, a value not more than a maximum value of an amount of soot (accumulation amount) that can be substantially trapped by the DPF 41*b*, which is a value close to the maximum value.

In a case of Yes in Step S7, as a second condition, the calculation unit 10*a* determines whether or not a temperature T of an exhaust gas (exhaust temperature T) introduced into the DPF 41*b*, i.e., a detection value of the exhaust temperature sensor SW7 is a threshold value Tx or more (Step S9).

In a case of Yes in Step S9, the calculation unit 10*a* determines whether or not a temperature rise rate TR in the DPF 41*b* is a threshold value TRx or more as a third condition (Step S11). The temperature rise rate TR in the DPF 41*b* is a predictive value. Specifically, the calculation unit 10*a* obtains an internal temperature of the DPF 41*b* from a predetermined calculation formula or the map on the basis of, for example, the above exhaust temperature T and a flow rate of an exhaust gas (a volume flow rate of an exhaust gas) F obtained from a detection value of the air flow sensor SW2, and obtains a rate of change (the temperature rise rate TR) of the internal temperature. Then, the temperature rise rate TR and the threshold value TRx are compared.

In a case where determination is made to be Yes in Step S11 (in a case where the above first to third conditions are satisfied), the calculation unit 10*a* determines that the DPF 41*b* satisfies an excessive temperature rise condition, i.e. that the DPF 41*b* has a possibility of having an excessive temperature rise. Then, the calculation unit 10*a* next determines whether high supercharging regeneration processing should be executed or not. Specifically, the flow rate of exhaust gas F is obtained on the basis of the detection value of the air flow sensor SW2 to determine whether or not the flow rate of exhaust gas F is a threshold value Fx or less (Step S13).

Here, "high supercharging regeneration processing" is processing of forcibly increasing a supercharging pressure of intake air by the turbosuperchargers 61 and 62 to be higher than during steady operation to increase the flow rate of exhaust gas F during the regeneration of the DPF 41*b*. By contrast, processing of executing the regeneration of the DPF 41*b* during steady operation in which a supercharging pressure of intake air by the turbosuperchargers 61 and 62 is barely generated is referred to as "normal regeneration processing".

In other words, even in a case where the DPF 41*b* satisfies the excessive temperature rise condition, i.e. where the DPF 41*b* has a possibility of having an excessive temperature rise, when an exhaust gas of a fixed or higher flow rate passes through the DPF 41*b*, an excessive temperature rise of the DPF 41*b* is suppressed by a cooling effect obtained by the passing of the exhaust gas. Therefore, a flow rate of an exhaust gas that can suppress an excessive temperature rise of the DPF 41*b* which has satisfied the excessive temperature rise condition is set to be the above threshold value Fx, and the calculation unit 10*a* compares the threshold value Fx and the flow rate of exhaust gas F to determine whether or not the high supercharging regeneration processing is necessary.

When determining that the DPF 41*b* does not satisfy the excessive temperature rise condition, i.e., determining to be No in Steps S7 to S11, and when determining that the high supercharging regeneration processing is not required, i.e., determining to be No in Step S13, the calculation unit 10*a* shifts the processing to Step S19. In this manner, the normal regeneration processing will be continued without shifting the regeneration processing of the DPF 41*b* to the high supercharging regeneration processing.

On the other hand, in a case where determination is made to be Yes in Step S13, i.e., in a case where the DPF 41*b* has a possibility of having an excessive temperature rise and the flow rate of exhaust gas F does not exceed the above threshold value Fx, the calculation unit 10*a* shifts the regeneration processing of the DPF 41*b* from the normal regeneration processing to the high supercharging regeneration processing.

Specifically, the calculation unit 10*a* corrects timing of the post-injection Po from the basic injection timing to an advanced side by a predetermined angle (Step S15).

In this example, as shown in the chart (A) of FIG. 5, a basic injection manner of the post-injection Po is determined such that a total of five, first to fifth post-injections Po1 to Po5 with an equal amount are conducted at fixed timing. The calculation unit 10*a* corrects timing of the first post-injection Po1 (corresponding to a preceding post-injection of the present invention) closest to a main injection Ma among the first to fifth post-injections Po1 to Po5 to the advanced side, and with the remaining second to fifth post-injections Po2 to Po5 (corresponding to a succeeding post-injection of the present invention) as one set, corrects timing of the post-injections Po2 to Po5 to the advanced side by an angle different from that of the timing of the first post-injection Po1. Specifically, as shown in the chart (B) of FIG. 5, the calculation unit 10*a* corrects the timing of the first post-injection Po1 to the advanced side by 30° CA (crank shaft angle) with respect to the basic injection timing, and corrects the timing of each of the second to fifth post-injections Po2 to Po5 to the advanced side by 10° CA (crank shaft angle) with respect to the basic injection timing, thereby causing the post-injection Po to be executed at corrected injection timing. An interval between the second to fifth post-injections Po2 to Po5 is set to be predetermined time.

When the post-injections Po1 to Po5 are conducted at the injection timing thus corrected to the advanced side, a part of the fuel of the post-injection Po, in particular, the fuel of the first post-injection Po1 is burned in the combustion chamber 14*a* to increase the exhaust gas temperature. In other words, heat energy will be increased. The heat energy generated by combustion of the fuel of the post-injection Po has a low rate thereof converted into mechanical energy for pushing the piston 14 and has a large part thereof discharged as energy of an exhaust gas (exhaust energy) from the combustion chamber 14*a*. Therefore, the exhaust energy is increased and the turbines 61*b* and 62*b* of the respective turbosuperchargers 61 and 62 accordingly rotate more, resulting in increasing a supercharging pressure of intake air to increase an exhaust gas flow rate. In other words, as compared with a case of the normal regeneration processing, an exhaust gas amount passing the DOC 41*a* during the regeneration processing will be increased.

On this occasion, the calculation unit 10*a* fully opens the throttle valve 36 in order to effectively increase a supercharging pressure of intake air, and also fully closes the first intake bypass valve 63*a*, the regulating valve 65*a*, and the wastegate valve 66*a*. In other words, the calculation unit 10*a* causes both the first turbosupercharger 61 and the second turbosupercharger 62 to operate.

Next, the calculation unit 10a determines whether a supercharging pressure of intake air P, i.e., a detection value of the intake pressure sensor SW3, reaches a predetermined target supercharging pressure Px or not (Step S17). The target supercharging pressure Px is set to be, for example, a value corresponding to the threshold value Fx of the flow rate of exhaust gas F, i.e., a value that can ensure a flow rate of an exhaust gas which suppresses the DPF 41b satisfying the above excessive temperature rise condition from having an excessive temperature rise.

In a case where determination is made to be No in Step S17, the calculation unit 10a determines whether or not the injection timing of the post-injection Po reaches a guard value GT (corresponding to an upper limit value of the present invention) set with the basic injection timing as a reference (Step S23). Here, in a case of determination of No, the calculation unit 10a further corrects the injection timing of the post-injection Po corrected in Step S15 to the advanced side by a predetermined angle (Step S25) and then shifts the processing to Step S17.

Specifically in Step S25, the calculation unit 10a corrects the injection timings of the post-injections Po2 to Po5 to the advanced side by the 10° CA, with the second to fifth post-injections Po2 to Po5 as one set, and in Step S23, determines whether the injection timings of the post-injections Po2 to Po5 reach the above guard value GT or not. The above guard value GT is timing when much of the fuel by the second to fifth post-injections Po2 to Po5 is burned in the combustion chamber 14a to be liable to influence output of the engine when the injection timing is advanced over the guard value GT, and the timing is set to be, for example, 30° CA (see the chart (C) of FIG. 5).

In a case where determination is made to be Yes in Step S23, the calculation unit 10a corrects to increase the injection amount of the post-injection Po by a predetermined amount (Step S27) and then shifts the processing to Step S13. Specifically, as shown in the chart (D) of FIG. 5, the calculation unit 10a corrects to increase the injection amounts of the second and third post-injections Po2 and Po3 among the second to fifth post-injections Po2 to Po5 by a predetermined amount (the same amount).

When the injection timings of the post-injections Po2 to Po5 are thus corrected to the advanced side and the injection amounts of the second and third post-injections Po2 and Po3 are further corrected and increased, a rate of the fuel burned in the combustion chamber 14a is increased out of the fuel by the post-injection Po to thereby increase exhaust energy, resulting in further increasing a supercharging pressure of intake air and consequently, a flow rate of an exhaust gas in the DPF 41b.

On the other hand, in a case where determination is made to be Yes in Step S17, i.e., when determination is made that the supercharging pressure of the intake air reaches the target supercharging pressure, the calculation unit 10a waits for a post-injection Po stop condition to be satisfied, and when determining that the stop condition is satisfied (Yes in Step S19), causes the post-injection Po to stop (Step S21). In other words, the calculation unit 10a switches the mode of the fuel injection by the injector 18 to a mode not including the post-injection Po. In this manner, the present flow chart ends.

In Step S19, as the above stop condition, the calculation unit 10a determines whether a preset time has elapsed from, for example, a time point when the regeneration of the DPF 41b has started (Step S5) or not, or whether the fuel injection of a set cycle has conducted or not.

[4] Operations and Effects

As described in the foregoing, in the diesel engine of the present example, when the regeneration condition is satisfied during operation, forced regeneration processing of the DPF 41b is executed. Then, by the regeneration processing, the DPF 41b might have an excessive temperature rise (Yes Step S7 to S11 in FIG. 6) and when the flow rate of an exhaust gas does not satisfies a flow rate that can suppress the excessive temperature rise (Yes in Step S13 in FIG. 6), the processing is shifted to the high supercharging regeneration processing. When the routine is shifted to the high supercharging regeneration processing, a supercharging pressure of intake air by the turbosuperchargers 61 and 62 is increased to be higher than during steady operation to increase the flow rate of exhaust gas during the regeneration processing of the DPF 41b. Accordingly, advancement of the regeneration processing of the DPF 41b under an operation condition where the flow rate of exhaust gas is low can be suppressed to prevent an excessive temperature rise of the DPF 41b, and consequently, prevent a trouble from occurring such as damage of the DPF 41b caused by the excessive temperature rise.

In particular, since during idling, a flow rate of an exhaust gas is extremely low, when the forced regeneration is executed with a large accumulation amount of soot, there is a concern that the DPF 41b might have an excessive temperature rise to be damaged or the like. However, shifting to the above high supercharging regeneration processing can prevent such a trouble from occurring.

FIG. 8 shows a result of relationships among the internal temperature, the supercharging pressure, and the flow rate of exhaust gas of the DPF 41b when the regeneration of the DPF is started during steady drive of the vehicle (engine) mounted with the turbosupercharger engine, and thereafter, the vehicle is stopped (idling) under control conditions different from each other. In the drawing, a graph (the graph indicated by circled code 1) shown by a chain dotted line represents a case where even after the vehicle is stopped, an engine rotational speed is maintained to be the same rotational speed as that during driving, a graph (the graph indicated by circled code 2) shown by a solid line represents a case where after the vehicle is stopped, the engine rotational speed is maintained to be an idling rotational speed, and a graph (the graph indicated by circled code 3) shown by a broken line represents a case where after the vehicle is stopped, with the engine rotational speed maintained to be the same as the idling rotational speed, a supercharging pressure of intake air is increased (i.e., a case where the processing is shifter to the above high supercharging regeneration processing). The soot accumulation amount in the DPF is the same in every case and an engine rotational speed during driving is also the same in every case.

As indicated by the solid line graph in the drawing, when a vehicle is stopped to shift to idling, it is a common practice that a supercharging pressure by a turbosupercharger is barely generated and an intake pressure is reduced to reduce a flow rate of an exhaust gas. Therefore, a DPF cooling effect is decreased to result in having a high internal temperature of the DPF. However, as shown in the broken line graph, when a supercharging pressure of intake air is increased in a state of idling after the vehicle is stopped, the internal temperature of the DPF is suppressed low. This is considered that the regeneration processing of the exhaust purification device 41 is shifted to the high supercharging regeneration processing to suppress reduction in a flow rate of an exhaust gas. Also from the result, it can be considered that according to the configuration of the above embodiment, an excessive temperature rise at the time of DPF during idling can be effectively suppressed.

Additionally, according to the configuration of the above embodiment, since in the high supercharging regeneration processing, the target supercharging pressure Px of intake air is set so as to have the flow rate of exhaust gas F that enables an excessive temperature rise of the DPF 41b to be suppressed, and injection timing and an injection amount of the post-injection Po are feedback-controlled on the basis of an output (supercharging pressure P) from the intake pressure sensor SW3. It is therefore possible to more reliably increase a supercharging pressure of intake air to the target supercharging pressure Px, i.e., to more reliably increase the flow rate of exhaust gas F to a flow rate that enables an excessive temperature rise of the DPF 41b to be suppressed. It is accordingly possible to more reliably prevent a trouble from occurring such as damage of the DPF 41b caused by the excessive temperature rise during regeneration processing.

Also, in the control of a supercharging pressure in the high supercharging regeneration processing, while the injection timing of the first post-injection Po1 is advanced as largely as possible within a range not affecting an engine output, the injection timings of the second to fifth post-injections Po2 to Po5 are advanced by a degree smaller than the first post-injection Po1 (Step S15 in FIG. 6), and then, when the supercharging pressure P does not reach the target supercharging pressure Px, the injection timings of the second to fifth post-injections Po2 to Po5 are advanced in stages while maintaining the injection timing of the first post-injection Po1. It is therefore possible to increase a supercharging pressure of intake air, i.e. increase exhaust energy of the engine while avoiding an effect on an engine output exerted by burning of much of fuel by the post-injection Po at once.

Besides, since in a case where a supercharging pressure does not reach the target supercharging pressure even by advancing the injection timings of the second to fifth post-injections Po2 to Po5 to the guard value GT, the injection amounts of the second and third post-injections Po2 and Po3 are further increased to increase the supercharging pressure of the intake air, a supercharging pressure of intake air can be more reliably increased to the target supercharging pressure Px. Since in this case, the injection amounts of the second and third post-injections Po2 and Po3 are in particular increased, it is advantageous in suppressing an engine output from being affected and dilution of oil caused by mixing of fuel with engine oil. Specifically, in a case where the injection amount of the first post-injection Po1 is increased, it is expected that burning of much fuel by the post-injection at timing near the main combustion affects an engine output, and conversely, in a case where the injection amounts of the fourth and fifth post-injections Po4 and Po5 are increased, it is expected that injecting much fuel in the latter period of the expansion stroke facilitates mixing of fuel with engine oil. In this regard, in a case where the injection amounts of the second and third post-injections Po2 and Po3 are increased, a fuel injection amount can be increased without involving such disadvantages.

Also according to the configuration of the above embodiment, in the regeneration processing, determination of possibility/impossibility of an excessive temperature rise of the DPF 41b is made (Steps S7 to S11 in FIG. 6), and only when determination is made that an excessive temperature rise is possible, the processing shifts to the high supercharging regeneration processing and otherwise, the normal regeneration processing is continued. Therefore, the configuration has a further advantage that fuel consumption not contributing to an engine output, and consequently, deterioration of fuel consumption can be suppressed. In other words, in the high supercharging regeneration processing, since with the timing of the post-injection Po advanced, a part of fuel by the post-injection Po is burned to increase exhaust energy, fuel not contributing to driving of the vehicle and the like is consumed. Accordingly, it is desirable to have less fuel to be burned by the post-injection Po. In this regard, by the control of the above embodiment in which the processing shifts to the high supercharging regeneration processing only when determination is made that an excessive temperature rise is possible, a fuel consumption amount can be suppressed more than in control in which the processing uniformly shifts to the high supercharging regeneration processing in a case, for example, where the flow rate of exhaust gas F is not more than the above threshold value Fx. Accordingly, it is possible to reasonably suppress an excessive temperature rise of the DPF 41b while suppressing fuel consumption.

[5] Modifications, Etc.

The diesel engine according to the above-described embodiment is an example of an engine with a turbosupercharger to which the regeneration control device according to the present invention (for the exhaust purification device) is applied, and a specific configuration of the regeneration control device, i.e., specific contents of the regeneration control of the exhaust purification device (the DPF 41b), can be appropriately changed without departing from the gist of the present invention. For example, such a configuration as follows can be adopted.

(1) In the above embodiment, after starting the regeneration processing of the DPF 41b, determination of possibility/impossibility of an excessive temperature rise of the DPF 41b is made, and when determination is made that an excessive temperature rise is possible, the regeneration processing of the DPF 41b is shifted from the normal regeneration processing to the high supercharging regeneration processing. However, in a case where before the regeneration processing of the DPF 41b starts, the calculation unit 10a determinates possibility/impossibility of an excessive temperature rise of the DPF 41b, and when determination is made that there is no possibility, while the normal regeneration processing is executed as the regeneration processing, when determination is made that there is possibility, the high supercharging regeneration processing can be executed as the regeneration processing.

(2) In the above embodiment, the present invention is applied to the diesel engine of a type that executes forced regeneration of the DPF 41b by conducting the post-injection Po of fuel. However, the present invention is also applied to, for example, a diesel engine which conducts the post-injection aiming at activation of an exhaust purification device (DOC, DPF) while operating a heater provided in a DPF to execute forced regeneration of the DPF. In this case, after starting the regeneration processing of the DPF by operating the heater, timing of the above post-injection aiming at activating the exhaust purification device (DOC, DPF) is advanced within a range not affecting an engine output. In this manner, similar to the above embodiment, execution of the high supercharging regeneration processing is allowed. The present invention is applied also to a diesel engine in which forced regeneration of a DPF is conducted by other method than operation of a heater as long as the post-injection is conducted.

(3) In the above embodiment, the total of five, the first to fifth post-injections Po1 to Po5 are conducted at fixed timing as the post-injection Po for conducting the regeneration processing of the DPF 41b. An injection manner (injection amount, injection pattern, injection timing) of the post-injection Po, however, is not limited thereto.

Also, the manner of advance correction of the post-injection Po in the high supercharging regeneration processing and the manner of increasing an injection amount in the above embodiment are each one example and can be appropriately changed.

For example, timing of only the first post-injection Po1 may be corrected to the advanced side and then, the remaining second to fifth post-injections Po2 to Po5 may be advanced as one set. Also the timing of the second to fifth post-injections Po2 to Po5 may be, other than advanced as one set, each sequentially advanced in stages starting from the second post-injection Po2.

Figure 7:
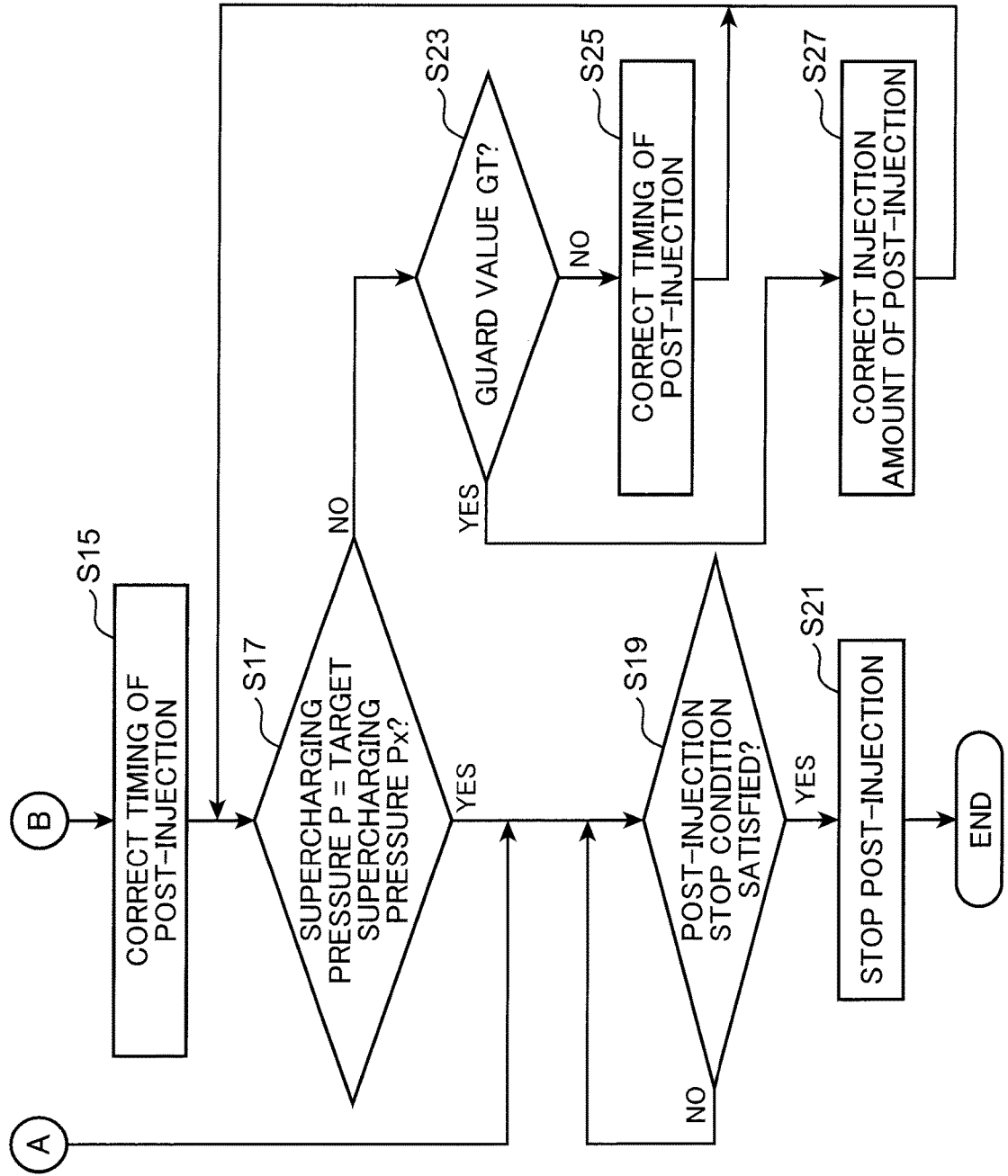
FIG. 7 is a flow chart showing control contents of the DPF regeneration processing of the above engine.

Although not referred to in the above embodiment (FIG. 7), regarding injection amounts of the fourth and fifth post-injections Po4 and Po5, a fixed injection amount of the post-injection may be corrected in stages such that a detected supercharging pressure P becomes the target supercharging pressure Px. In this case, other than increasing the injection amounts of the fourth and fifth post-injections Po4 and Po5 simultaneously, the injection amounts of the post-injections may be increased in stages starting from the second post-injection Po2. An upper limit value for increasing one post-injection is desirably, for example, about twice the basic injection amount in order to suppress an effect on an engine output.

(4) While in the above embodiment, the present invention is applied to a diesel engine, it is applied also to a gasoline engine.

The present invention summarized on the basis of the foregoing embodiment is as follows.

The present invention relates to, in an engine with a turbosupercharger having an exhaust purification device equipped with a filter which traps particulate matters in exhaust air, a regeneration control device for the exhaust purification device, the regeneration control device including a regeneration controller that executes regeneration control in which particulate matters trapped by the filter are removed by combustion; and a post-injection controller that during the regeneration control, executes control in which a time period of a post-injection of fuel executed subsequently to a main injection of fuel is advanced such that a supercharging pressure of the turbosupercharger becomes higher than a supercharging pressure during steady operation.

According to this configuration, during the regeneration control of the filter, by advancing a time period of the post-injection, a part of fuel by the post-injection is burned to increase exhaust energy of the engine, resulting in increasing a supercharging pressure (intake pressure) of the turbosupercharger to be higher than during steady operation. As a result, a flow rate of an exhaust gas passing through the filter is increased to effectively suppress an excessive temperature rise (a temperature rise) of the filter.

The regeneration control device further includes a supercharging pressure detector which detects a supercharging pressure of intake air of the engine, in which the post-injection controller may advance the time period of the post-injection such that a supercharging pressure detected by the supercharging pressure detector becomes a target supercharging pressure set in advance.

According to this configuration, since the time period of the post-injection is advanced on the basis of an actual supercharging pressure (a detected supercharging pressure), a supercharging pressure of intake air can be more reliably increased to the target supercharging pressure.

In this case, the post-injection can be a plural-stage post-injection including a preceding post-injection and one or a plurality of succeeding post-injections conducted thereafter. In this case, the post-injection controller preferably advances a time period of at least the preceding post-injection to a specific time period, and in a case where the supercharging pressure detected then does not reach the target supercharging pressure, further advances timing of the succeeding post-injection.

According to this configuration, it is possible to suppress dilution of oil caused by mixing of fuel with engine oil by the post-injection via a cylinder wall. It is also possible to effectively increase exhaust energy of the engine without affecting an engine output.

In the regeneration control device, the post-injection controller preferably increases an injection amount of the post-injection in a case where the supercharging pressure detected when the time period of the post-injection is advanced to an upper limit value set in advance does not reach the target supercharging pressure.

According to this configuration, a combined effect obtained by advancing the time period of the post-injection and by an increase in an injection amount of the post-injection enables exhaust energy to be effectively increased.

In this case, the post-injection is preferably a plural-stage post-injection including a preceding post-injection and one or a plurality of succeeding post-injections conducted thereafter, and the post-injection controller preferably increases only an injection amount of the succeeding post-injection.

According to this configuration, exhaust energy of the engine can be increased by increasing an injection amount of fuel within a range not affecting an engine output.

The regeneration control device preferably further includes an excessive temperature rise determinator which determines possibility/impossibility of an excessive temperature rise of the filter in the regeneration control, in which the post-injection controller executes control for advancing the time period of the post-injection only when determination is made by the excessive temperature rise determinator that the filter has a possibility of having an excessive temperature rise.

According to this configuration, since only when determination is made that the filter has a possibility of having an excessive temperature rise, the time period of the post-injection of fuel is advanced, it is possible to suppress fuel consumption not contributing to engine output and dilution of oil caused by mixing of fuel with engine oil.

More specifically, the regeneration control device further includes an exhaust temperature detector which detects a temperature of an exhaust gas and an exhaust flow rate detector which detects a flow rate of an exhaust gas, in which the excessive temperature rise determinator predicts a temperature rise rate in the filter on the basis of an exhaust temperature detected by the exhaust temperature detector, and determines that the filter has a possibility of having an excessive temperature rise in a case where a predictive value of the temperature rise rate is a threshold value or more and a flow rate of an exhaust gas detected by the exhaust flow rate detector is a threshold value or less.

According to this configuration, it is possible to determine with high precision whether the filter has a possibility of having an excessive temperature rise or not.

In the regeneration control device, the exhaust purification device further includes an oxidation catalyst upstream of the filter in an exhaust flow direction, and the post-injection is a fuel injection conducted as the regeneration control in a time period not directly contributing to an engine output after the main injection.

According to this configuration, combustion of unburned fuel with an oxidation catalyst by the post-injection leads to an increase in a temperature of an exhaust gas, resulting in removing particulate matter trapped by the filter by combustion. In other words, the filter is regenerated. Then, only when determination is made by the excessive temperature rise determinator that the filter has a possibility of having an excessive temperature rise during the regeneration, the time period of the post-injection is advanced. In this manner, exhaust energy of the engine is increased. This makes it possible to suppress an excessive temperature rise of the filter by using a reasonable configuration in which the time period of the post-injection itself for filter regeneration is advanced.

The invention claimed is:

1. A regeneration control device for an exhaust purification device in an engine with a turbo-supercharger having the exhaust purification device equipped with a filter that traps particulate matters in exhaust gas discharged from the engine, the regeneration control device for the exhaust purification device comprising:
    a regeneration controller that executes regeneration control in which particulate matters trapped by the filter are removed by combustion;
    a post-injection controller that during the regeneration control, executes control in which a post-injection time period of fuel executed subsequently to a main injection time period of fuel is advanced such that a supercharging pressure of the turbo-supercharger becomes higher than a supercharging pressure during steady operation; and
    an excessive temperature rise determinator that determines a possibility or an impossibility of an excessive temperature rise of the filter in the regeneration control via an exhaust temperature detector, wherein
    the post-injection controller executes a control for advancing the post-injection time period only when the excessive temperature rise of the filter in the regeneration control is determined via the excessive temperature rise determinator.

2. The regeneration control device for the exhaust purification device according to claim 1, further comprising a supercharging pressure detector that detects a supercharging pressure of intake air of the engine, wherein
    the post-injection controller advances the post-injection time period of fuel such that the supercharging pressure, detected by the supercharging pressure detector, becomes a target supercharging pressure set in advance.

3. The regeneration control device for the exhaust purification device according to claim 2, wherein
    the post-injection is a plural-stage post-injection including a preceding post-injection and one of a plurality of succeeding post-injections conducted after the preceding post-injection, and
    the post-injection controller advances a time period of at least the preceding post-injection to a time period at which the supercharging pressure, having been detected, does not reach the target supercharging pressure, and further advances timing of the one of the plurality of the succeeding post-injections.

4. The regeneration control device for the exhaust purification device according to claim 2, wherein the post-injection controller increases an injection amount of the post-injection when the supercharging pressure, having been detected during the post-injection time period being advanced to an upper limit value set in advance, does not reach the target supercharging pressure.

5. The regeneration control device for the exhaust purification device according to claim 4, wherein
    the post-injection is a plural-stage post-injection including a preceding post-injection and one of a plurality of succeeding post-injections conducted after the preceding post-injection, and
    the post-injection controller increases only an injection amount of the one of the plurality of the succeeding post-injections.

6. The regeneration control device for the exhaust purification device according to claim 1, further comprising:
    an exhaust flow rate detector that detects a flow rate of the exhaust gas, wherein
    the excessive temperature rise determinator predicts a temperature rise rate in the filter based on an exhaust temperature detected by the exhaust temperature detector, and determines that the filter has the possibility of having the excessive temperature rise when:
    a predictive value of the temperature rise rate is equal to or greater than a threshold value; and
    a flow rate of an exhaust gas detected by the exhaust flow rate detector is equal to or less than a threshold value.

7. The regeneration control device for the exhaust purification device according to claim 6, wherein
    the exhaust purification device further includes an oxidation catalyst upstream of the filter in an exhaust flow direction, and
    the post-injection is a fuel injection conducted as the regeneration control in a time period not directly contributing to an engine output after the main injection.

8. The regeneration control device for the exhaust purification device according to claim 1, wherein
    the exhaust purification device further includes an oxidation catalyst upstream of the filter in an exhaust flow direction, and
    the post-injection is a fuel injection conducted as the regeneration control in a time period not directly contributing to an engine output after the main injection.

* * * * *